May 2, 1967 E. F. LAPORTE 3,317,756
SIGNAL INTEGRATING APPARATUS
Filed Aug. 24, 1964 2 Sheets-Sheet 1

INVENTOR.
EUGENE F. LAPORTE
BY
ATTORNEY

INVENTOR.
EUGENE F. LAPORTE
BY
ATTORNEY 3,317,756
Patented May 2, 1967

3,317,756

SIGNAL INTEGRATING APPARATUS

Eugene F. Laporte, Chino, Calif., assignor to North American Aviation, Inc.

Filed Aug. 24, 1964, Ser. No. 391,369
4 Claims. (Cl. 307—88.5)

The subject invention relates to signal integrating apparatus, and more particularly to means for providing an analog output signal indicative of the time-integral of a bipolar periodic pulse input.

In the design of closed-loop control systems such as automatic electronic frequency controllers, an error signal indicative of the difference between a sensed condition or frequency of a voltage-controlled oscillator and a preselected condition or reference frequency is employed to control the frequency of the oscillator in such a sense as to tend to reduce the error signal to zero. However, if the system error were somehow reduced to zero, then no control bias voltage would be maintained at the voltage-controlled oscillator. On the other hand, the maintenance of a control bias at the voltage-controlled oscillator in response to the error signal would require a finite steady-state system error to produce such signal.

In an automatic electronic frequency controller for a pulse radar system employing a klystron as a local oscillator, a frequency discriminator provides periodic bipolar pulses, the polarity of which are indicative of the sense of an error in the controlled frequency. However, an analog control voltage is normally required for control of the repeller of the klystron oscillator. Hence, pulse-stretching means has been employed in the prior art for providing an analog control voltage in response to such pulse signals. Further, because of the relatively high voltages required for repeller control of the klystron oscillator and the normally low voltage levels of a solid-state form of frequency discriminator, a voltage interface design problem exists between the output of such solid state circuitry and the control input to the voltage controlled klystron, requiring buffer stage circuitry.

By means of the concept of the subject invention, a bipolar pulse integrator is interposed between the system error signal source (frequency discriminator) and the voltage controlled element (klystron oscillator) in order to develop a steady-state control bias indicative of the time-integral of the system error. In this way, the condition of the controlled element (frequency of the oscillator) is maintained at a selected condition, thereby reducing the system error signal to zero and effecting no further change in the output or control bias provided by the integrator. Further, an analog control signal is thus provided in response to a pulse input, thereby obviating the need of pulse-stretching circuits.

In a preferred embodiment of the invention, there is provided a pair of series interconnected capacitors adapted to be connected across a source of D.-C. potential, the interconnection of the capacitors comprising an output terminal. There is further provided first and second switching means, each connected across a mutually exclusive one of the capacitors and having a control terminal. The control terminals are commonly connected to form an input terminal, such control terminals being responsive to mutually exclusive polarities of an input potential applied to the input terminal.

In normal operation of the above described arrangement, the switching means cooperate to discharge a selected one of the two capacitors corresponding a preselected polarity of the applied input potential, thereby changing the potential of the output terminal correspondingly. The amount of the potential change is a function of the duration of an applied potential of a given polarity. Hence, where the applied input is in the form of bipolar pulses or discrete signals of limited amplitude, such as in the error signal circuit of an AFC circuit for a pulsed radar system, the potential of the output terminal indicates the analog integral of a time series of such discrete signals.

By means of the above-described arrangement, means is provided for substantially reducing the system error of an AFC system. Also, the necessity of pulse stretching circuits, in AFC units for pulsed radar systems, is obviated. Further, the switching means may easily be made responsive to the very low voltage signals of a frequency discriminator of solid-state design, for effecting control of a pair of capacitors serially connected across a high-voltage D.–C. source. In this way, the voltage interface requirements are resolved in effecting control of the high-potential repeller of a klystron oscillator by a control signal of low potential. Accordingly, it is an object of the subject invention to provide improved bipolar signal integrating means.

It is another object of the invention to provide means responsive to bipolar pulse signals for providing an analog signal indicative to the time-integral thereof.

It is still another object of the invention to provide signal integrating means adapted to be responsive to input signals of extremely low levels for conveniently controlling a high potential source.

It is a further object of the subject invention to provide means adapted to be responsive to signals of two mutually opposed senses or mutually exclusive states, for providing an analog output signal indicative of the time integral of the duration of each of such states.

These and other objects of the subject invention will become apparent from the following description taken together with the accompanying drawings in which.

In the figures, like reference characters refer to like parts.

Figure 1:
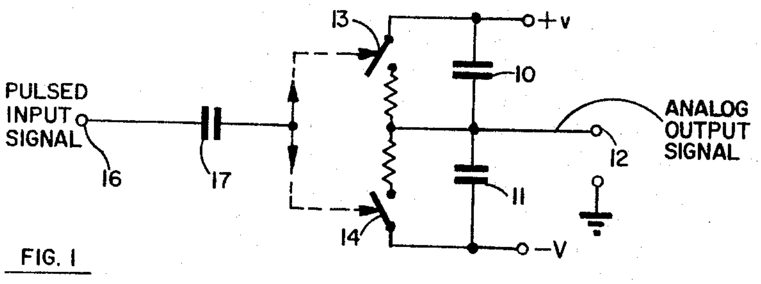
FIG. 1 is a schematic arrangement illustrating the concept of the invention.

Referring now to FIG. 1, there is illustrated a block diagram of a system employing the concept of the invention. There is provided a pair of series-interconnected capacitors 10 and 11, adapted to be connected across a source of D.–C. potential, the interconnection of capacitors 10 and 11 comprising an output terminal 12. There is also provided first and second (normally open) switching means 13 and 14, each connected across a mutually exclusive one of capacitors 10 and 11 and having a control terminal 15*a* and 15*b*. Control terminals 15*a* and 15*b* are commonly connected to form an input terminal 16, control terminals 15*a* and 15*b* being responsive to mutually exclusive polarities of an input potential applied to input terminal 16, switch 13 being responsive to positive input potentials and switch 14 being responsive to negative input potentials. A capacitor 17 or like reactive coupling means is integrated in series circuit between input terminal 16 and commonly connected control terminal 15 to decouple any D.-C. bias in the preceding stage or pulsed signal source (not shown).

In normal operation of the device of FIG. 1, switches 13 and 14 are normally open, with an output potential on output terminal 12 corresponding to the distribution of the potential applied across series capacitors 10 and 11. Upon the application of a signal pulse to input terminal 16, switches 13 and 14 cooperate to discharge a selected one of capacitors 10 and 11 corresponding to a preselected polarity of an applied potential. For example, in response to the application of a positive electrical pulse to input terminal 16, first switch 13 closes, discharging first capacitor 10, during the interval of the applied pulse, the extent of the discharge being indicative of such interval, (the charge on second capacitor 11 being correspondingly increased). Such lesser charge on first capacitor 10 is manifested by a lesser positive potential drop across first capacitor 10 (i.e., between the positive terminal of the D.-C. voltage source and output terminal 12), and correspondingly shifts the potential of output terminal in a positive sense. In other words, the output potential on terminal 16 incrementally steps in a positive direction in response to a positive pulse applied to input terminal 16.

Similarly, when a negative pulse is applied to the input terminal 16, second switch 14 closes during the interval of such pulse, thereby partially discharging second capacitor 11 (the charge on series capacitor 10 being correspondingly increased), which shifts the potential of terminal 12 in a negative direction.

Figure 2:
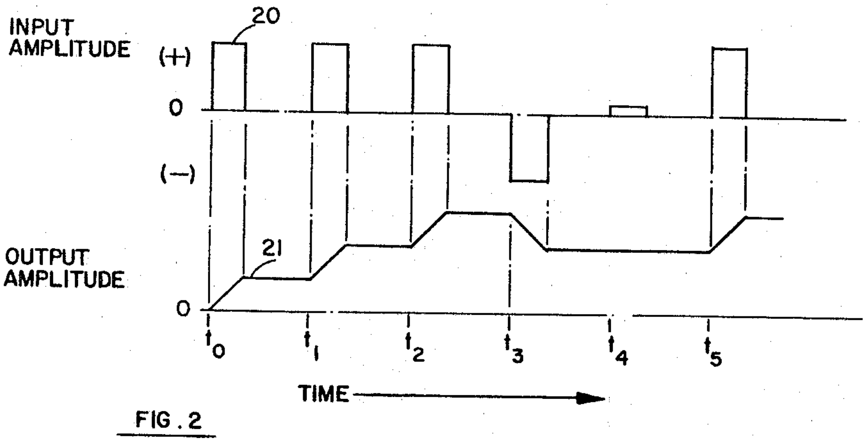
FIG. 2 is a family of time histories illustrating the response of the device of FIG. 1 to a train of bipolar sense inputs.

Such response of the analog output of the device of FIG. 1 to a pulsed input applied thereto is more clearly shown in FIG. 2, curve 20 being a time history of a period bipolar pulsed input applied to terminal 16, and curve 21 being a time history of the corresponding analog output occurring on terminal 12.

Hence, it is to be appreciated that the arrangement of FIG. 1 provides a D.-C. output voltage which is a function of the time integral of the pulse-inputs applied thereto.

Figure 3:
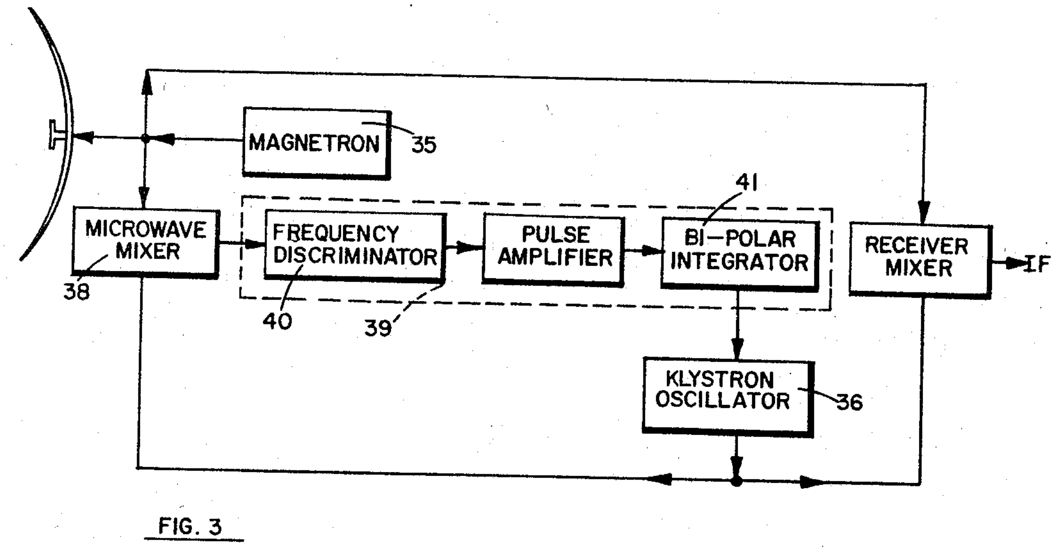
FIG. 3 is a block diagram of a system employing the concept of the invention.

A block diagram of a system employing the concept of the inventon is shown in FIG. 3.

Referring to FIG. 3, there is illustrated a block diagram of an AFC unit for a pulsed radar system employing the bipolar pulse integrator concept of FIG. 1. Such system, more fully described in my co-pending patent application No. 374,728, filed June 12, 1964, comprises a frequency discriminator 40 responsive to the pulsed IF output from a microwave mixer 38 for providing a bipolar pulsed output having an indicative of the sense of the AFC system error. There is further provided a bipolar pulse integrator (reference character) 41 responsively coupled to discriminator 40 for control of a klystron oscillator 36. Because the pulse outputs from frequency discriminator 40 are indicative of the AFC system error, it is to be appreciated that the resulting stored signal at the output of integrator 41 is indicative of time-integral of the AFC system error. Further, such stored signal continues to provide a signal reference, or to "remember" the system error when no pulse input is provided due, for example, to the transistor magnetron "missing" a pulse or omitting to "fire." Moreover, the large output shunt capacitance of integrator 41 serves to make the AFC system 39 insensitive to normal system transients.

Figure 4:
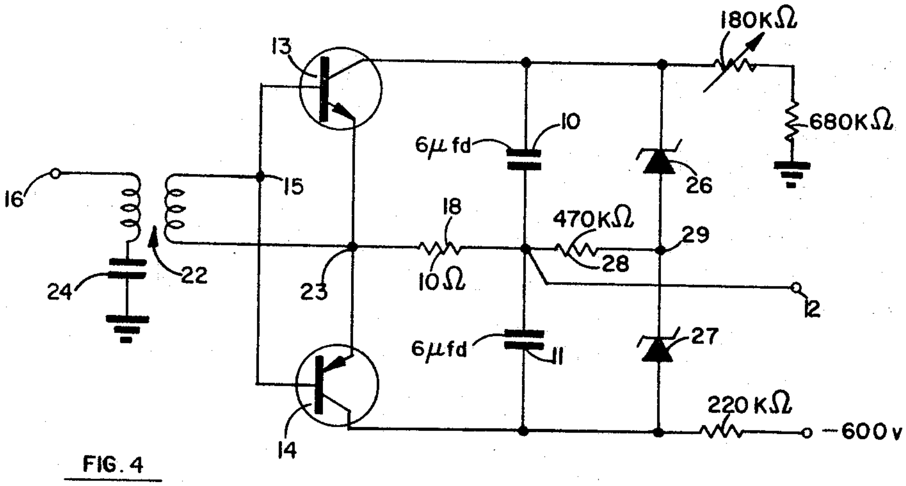
FIG. 4 is a schematic diagram of a preferred embodiment of the invention.

Bipolar integrator 41 not only serves both a signal storage function (thereby eliminating the need for pulse-stretching circuits commonly employed in the AFC prior art) and a signal integrating function (thereby reducing AFC closed-loop steady-state performance errors toward zero), but also provides simple and effective means for resolving the high-voltage interface design problem between low-potential solid-state AFC units and a klystron oscillator, as shown in the preferred embodiment of FIG. 4.

Referring to FIG. 4, there is illustrated a schematic diagram of a preferred embodiment of the invention. There is provided a pair of series interconnected capacitors 10 and 11 connected across a high voltage source of D.-C. potential, such as that adapted for repeller voltage control of a klystron, the interconnection of capacitors 10 and 11 forming an output terminal 12.

There is also provided a low-impedance coupling resistor 18 having one terminal thereof connected to output terminal 12, as to be commonly in R-C series discharge circuit with each of capacitors 10 and 12. There is further provided a pair of complementary or oppositely-poled switching transistors 13 and 14 having the control terminals 15 or base electrodes thereof commonly connected by reactive impedance means to an input terminal 16, adapted to be connected to a source (not shown) of pulsed signals such as, for example, the frequency discriminator element of FIG. 4. The reactive coupling impedance may be comprised of a pulse transformer 22, having a secondary winding connected across terminal 15 and the second terminal 23 of resistor 18. A capacitor 24 is connected in series with the primary winding of pulse transformer 22 in order to prevent the saturation of the core of transformer 22 due to a D.-C. bias component in the pulse signal source (not shown) to which terminal 16 may be connected.

As illustrated, switching transistor 13 may be type 2N2845 as manufactured by Fairchild Semiconductor Corp. of Mountain View, Calif.; and transistor 14 may be type 2N2907A as manufactured by Motorola Semiconductor Products, Inc., of Phoenix, Ariz. The emitter-collector circuit of each of transistor 13 and 14 is connected across a mutually exclusive one of the R-C series circuits formed by each of capacitors 10 and 11 with resistor 18. The high-voltage source comprises a bleeder network of two like-poled series connected zener diodes connected in parallel with series connected capacitors 10 and 11, and in series with a high source impedance. A high-impedance resistor connects output terminal 12 and the interconnection 29 of zener diodes 26 and 27. Zener diodes 26 and 27 also establish the integration limits of the integrator of FIG. 4.

In normal operation of the device of FIG. 4, switches 13 and 14 are normally open in the absence of a pulsed input applied to terminal 16, and the potential on output terminal 12 tends to drift toward a reference potential level corresponding to that of terminal 29. However, such response of terminal 12 is very slow, in view of the large R-C time constant contributed by resistor 28, the time constant being selected to be large relative to the pulse repetition interval of the pulsed signal source with which the device of FIG. 4 is intended to cooperate.

Upon application of an input pulse to input terminal 16, a selected one of capacitors 10 and 11, corresponding to a preselected polarity of the pulsed input, is shunted by the conduction of an associated one of transistors 13 and 14 in response to such input. Such shunting of one of the capacitors by that conduction of an associated transistor causes such capacitor to be incrementally discharged, the R-C time constant associated with the discharge response being less than that of the reference potential circuit, due to the low combined impedance of resistor 18 and the conductive state of either one of transistor 13 and 14. In addition to limiting the discharge time constant, low impedance resistor 18 also provides a negative feedback signal to the base of each of transistors 13 and 14, whereby the forward biasing of the base of the conductive transistor is limited and the back bias of the base of the non-conductive transistor is limited, as to protect the transistors from damage.

The circuit values shown in FIG. 4 are intended for cooperation with a pulsed signal source having a pulse repetition frequency of 2000 c.p.s., and providing a signal pulse of 5 volts amplitude and .5 microsecond duration, for providing a D.-C. signal having a reference level of —400 v. D.-C. to the repeller plate of a klystron oscillator having a modulation sensitivity of 3 megacycles per volt. The time-constant of the integration centering or drift to reference is about 13.7 seconds, which is substantially in excess of the periodicity associated with the 2000 c.p.s. PRF. Further, the discharge rate of each capacitor in response to a suitably-poled pulse is 44 millivolts per pulse, which rate is compatible with the sensitivity of the klystron. Hence, the illustrated circuit values of FIG. 4, in response to the described input specified, will provide a response as shown by curve 21 in response to the bipolar input illustrated by curve 20. Where, of course, the amplitude of the pulses tend to vary, then the incremental change in output will vary correspondingly.

Although selected values are shown for the circuit parameters of FIG. 4, it is clear that such values are exemplary only and that other values may be employed; also, while the time-constants employed have been described relative to a selected style of input, it is to be appreciated that such time constants may be varied as required to accommodate other inputs.

Hence, it is to be appreciated that improved means has been described for providing a analog output indicative of the time integral of a cyclical pulsed input signal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A pulse-signal integrator comprising:

a pair of series-interconnected capacitors connected across a D.-C. source of fixed potential, the interconnection of said capacitors forming an output terminal;

a low-impedance coupling resistor having one terminal connected to said output terminal as to be commonly in series R-C discharge circuit with each of said capacitors; and a pair of complementary switching transistors having the control terminals thereof commonly connected by reactive impedance means to an input terminal adapted to be connected to a bipolar source of pulse input signals, the emitter-collector circuit of each said transistors being connected across a mutually exclusive one of said R-C circuits, whereby a selected one of said capacitors is shunted in response to a preselected polarity of a pulsed input applied to said input terminal.

2. A pulse-signal integrator comprising:

a pair of series-interconnected capacitors connected across a D.-C. source of fixed potential, the interconnection of said capacitors forming an output terminal;

a low-impedance coupling resistor having one terminal connected to said output terminal as to be commonly in series R-C circuit with each of said capacitors;

a pair of complementary switching transistors having the control terminals thereof commonly connected by reactive impedance means to an input terminal adapted to be connected to a bipolar source of pulse input signals, the emitter-collector circuit of each said transistors being connected across a mutually exclusive one of said R-C circuits, whereby a selected one of said capacitors is shunted in response to a preselected polarity of a pulsed input applied to said input terminal;

a bleeder network comprising pair of like-poled series interconnected zener diodes shunt connected across said pair of capacitors, and a high-impedance coupling resistor connected across said output terminal and the interconnection of said diodes.

3. In an automatic intermediate frequency control system having a voltage controlled local oscillator and a frequency discriminator for providing a bipolar pulsed output indicative of the frequency deviation of an intermediate frequency difference between said voltage controlled local oscillator and a pulsed reference frequency source from a preselected intermediate frequency, bipolar pulse integrating means responsive to the pulsed output of said discriminator for control of said voltage-controlled local oscillator and comprising a pair of series-interconnected capacitors connected across a D.-C. source of fixed potential, the interconnection of said capacitors forming an output terminal;

a low-impedance coupling resistor having one terminal connected to said output terminal as to be commonly in series R-C circuit with each of said capacitors;

a pair of complementary switching transistors having the control terminals thereof commonly connected by reactive impedance means to said bipolar pulsed output, the emitter-collector circuit of each said transistors being connected across a mutually exclusive one of said R-C circuits, whereby a selected one of said capacitors is shunted in response to a preselected polarity of a pulsed input applied to said control terminals;

a bleeder network comprising a pair of like-poled series interconnected zener diodes shunt connected across said pair of capacitors; and a high-impedance coupling resistor connected across said output terminal and the interconnection of said diodes.

4. An automatic frequency control system for an intermediate frequency signalling system in cooperation with a source of a pulsed carrier frequency signal, and comprising a voltage-controlled local oscillator having a control input;

a frequency discriminator responsive to an intermediate frequency difference between said pulsed source and said local oscillator for providing a bipolar pulsed output indicative of the deviation of said frequency difference from a preselected intermediate frequency; and bipolar pulse integrating means having an input terminal responsive to said bipolar pulsed output and having an output terminal coupled to said control input of said oscillator and comprising a pair of series-interconnected capacitors connected across a D.-C. source of fixed potential, the interconnection of said capacitors forming said output terminal; and a pair of complementary switching transistors having the control terminals thereof commonly connected to comprise said input terminal, said transistors being further arranged for shunting a selected one of said capacitors for a time interval corresponding to the duration of a pulsed input of a preselected polarity applied to said input terminal, thereby reducing the magnitude of said deviation.

References Cited by the Examiner

UNITED STATES PATENTS

| | | | |
|---|---|---|---|
| 2,782,267 | 2/1957 | Beck | 307—88.5 |
| 2,820,199 | 1/1958 | Greefkes | 307—88.5 |
| 3,119,029 | 1/1964 | Russell | 328—127 |

FOREIGN PATENTS

| | | |
|---|---|---|
| 58,320 | 9/1946 | Netherlands. |

ARTHUR GAUSS, *Primary Examiner.*

B. P. DAVIS, *Assistant Examiner.*